United States Patent
Agarwal et al.

(10) Patent No.: US 7,437,611 B2
(45) Date of Patent: Oct. 14, 2008

(54) SYSTEM AND METHOD FOR PROBLEM DETERMINATION USING DEPENDENCY GRAPHS AND RUN-TIME BEHAVIOR MODELS

(75) Inventors: Manoj K. Agarwal, New Delhi (IN); Karen Appleby, Ossining, NY (US); Manish Gupta, Elmsford, NY (US); Gautam Kar, Yorktown Heights, NY (US); Anindya Neogi, New Delhi (IN); Anca Sailer, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 558 days.

(21) Appl. No.: 10/968,917

(22) Filed: Oct. 21, 2004

(65) Prior Publication Data

US 2006/0101308 A1 May 11, 2006

(51) Int. Cl.
*G06F 11/00* (2006.01)
(52) U.S. Cl. .......................................... 714/26; 714/37
(58) Field of Classification Search ........................ None
See application file for complete search history.

(56) References Cited

U.S. PATENT DOCUMENTS

| | | | | |
|---|---|---|---|---|
| 5,944,782 A * | 8/1999 | Noble et al. | ................. | 709/202 |
| 6,532,552 B1 * | 3/2003 | Benignus et al. | ............... | 714/25 |
| 6,556,659 B1 * | 4/2003 | Bowman-Amuah | ........ | 379/9.04 |
| 6,816,461 B1 * | 11/2004 | Scrandis et al. | ............. | 370/242 |
| 6,907,549 B2 * | 6/2005 | Davis et al. | ................... | 714/46 |
| 7,043,661 B2 * | 5/2006 | Valadarsky et al. | ............. | 714/4 |
| 7,076,695 B2 * | 7/2006 | McGee et al. | ................. | 714/47 |
| 7,143,316 B2 * | 11/2006 | Christodoulou et al. | ....... | 714/43 |
| 7,213,174 B2 * | 5/2007 | Dahlquist et al. | ............. | 714/37 |
| 2002/0019870 A1 * | 2/2002 | Chirashnya et al. | ......... | 709/224 |
| 2004/0098223 A1 * | 5/2004 | Conrad | ....................... | 702/176 |
| 2005/0043922 A1 * | 2/2005 | Weidl et al. | ................. | 702/183 |

* cited by examiner

*Primary Examiner*—Gabriel L Chu
(74) *Attorney, Agent, or Firm*—Whitham, Curtis, Christofferson & Cook, PC; Anne V. Dougherty

(57) ABSTRACT

A problem determination system and method reduces the time and effort required by system administrators to trouble shot transaction processing difficulties in a large distributed I/T environment by monitoring system component performance and computing operational performance threshold limits based on dependency graphs for the system. Using this data, a prioritized list of suspect components for the I/T system is generated.

3 Claims, 4 Drawing Sheets

SYSTEM AND METHOD FOR PROBLEM DETERMINATION USING DEPENDENCY GRAPHS AND RUN-TIME BEHAVIOR MODELS

BACKGROUND OF THE INVENTION

1. Field of the Invention

The invention generally relates to a system and method for performing problem determination in large distributed information technology (I/T) environments and, more particularly, to a system having a set of algorithms and processes that analyze system dependency graphs, set acceptable operating limits, and create priority sequences of possible faulty resources for use by a system administrator to investigate the problem.

2. Background Description

An example of a large distributed I/T environment is a multi-tier e-business system which is supported by an infrastructure consisting of the following subsystems connected by local and wide area networks: web based presentation services, access services, application business logic, messaging services, database services and storage subsystems. One of the major challenges for administrators of such systems is to pinpoint the root-cause when a problem is discovered at a user end-point. For instance, if a user transaction is unacceptably slow to respond, the administrator needs to find out the cause, which may lie anywhere inside the system.

SUMMARY OF THE INVENTION

Prior solutions to the problems addressed herein have a myriad of drawbacks. Existing solutions to determining the source of the problem are notoriously slow and labor intensive. Known solutions to the problem are primarily based on event correlation. Each internal system component is configured with a threshold limit for each measured performance metric of the component. (For the purposes of this invention, the terms resources, system resources, computing resources are used interchangeably with the terms components or system components.) If a metric exceeds its corresponding threshold, an event is sent to a central correlation engine (CE). The CE applies a set of pre-configured expert correlation rules on the incoming events to determine the root cause. Since per-component and per-metric thresholds are hard to configure for a human administrator, several unnecessary events are typically generated in such a system, stressing the CE. This technique has worked in small systems, where the number of resources is in the hundreds. In large customer environments, where resources may number in the thousands and tens of thousands, the number of events generated is often overwhelming for the system to analyze and the number of components to be investigated by the system administrator can be quite high. This results in costly delays in identifying the root cause thereby resulting in an expensive problem determination and remediation process.

An exemplary aspect of the invention addresses the scalability problem by automatically and dynamically setting appropriate thresholds on internal components, thus reducing the number of events and the number of components that are investigated by a human administrator or any problem determination (PD) program.

Another exemplary aspect of the invention automatically computes operational limits for individual components that comprise a typical distributed I/T system based on user level Service Level Agreements (SLAs) using dependency graphs.

Still another exemplary aspect of the invention orders the suspected root cause components of the system using the operational limits and the dependency graphs so that a system administrator or problem determination program can investigate each component further in a priority sequence and find the root cause in the ordered list as early as possible.

Accordingly, a problem determination system and method is described that automates and tightens threshold assignments on individual components so that spurious events are not generated and components that are very unlikely to be root-causes are not investigated. An exemplary aspect of the invention reduces the number of components to be investigated and, therefore, the time required for problem determination.

For example, consider a transaction processing system that implements an electronic store-front. Each user transaction can be represented by a dependency graph, which depicts how the transaction is executed by the various I/T resources. Such a dependency graph can be extracted using various intrusive and non-intrusive approaches. An exemplary embodiment of the invention provides a computerized system having algorithms and computer implemented processes that can be used to calculate the acceptable operating thresholds of each resource in the dependency graph, based on some monitored metric, such as response time. Thus, if a transaction manifests a problem, such as, an unacceptably slow response time, the invention will first scan the dependency graph of the transaction in order to determine a set of resources that may be the likely root cause of the problem. Next, the invention will compare the current behavior of each of these resources to the threshold values, computed by the invention. Those resources that have operated outside of these thresholds will be marked as suspects. If the transaction system contains only one resource, then that is the root cause. If the invention identifies a set of suspects which contain more than one resource, then the resources in the set are ordered based on a sorting algorithm to create an ordered set, so that the system administrator or a PD program can probe the components individually in sequence to identify the root cause.

An important advantage of using this solution is a reduction in the time it takes to perform root cause analysis than in current systems. This is because the use of dependency information coupled with the behavior thresholds values (or limits) significantly reduces the number of resources that an administrator needs to examine for possible faults. This reduction in diagnosis time results in operational cost savings. A further advantage is that the problem determination system and method of this invention is more scalable than existing solutions.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
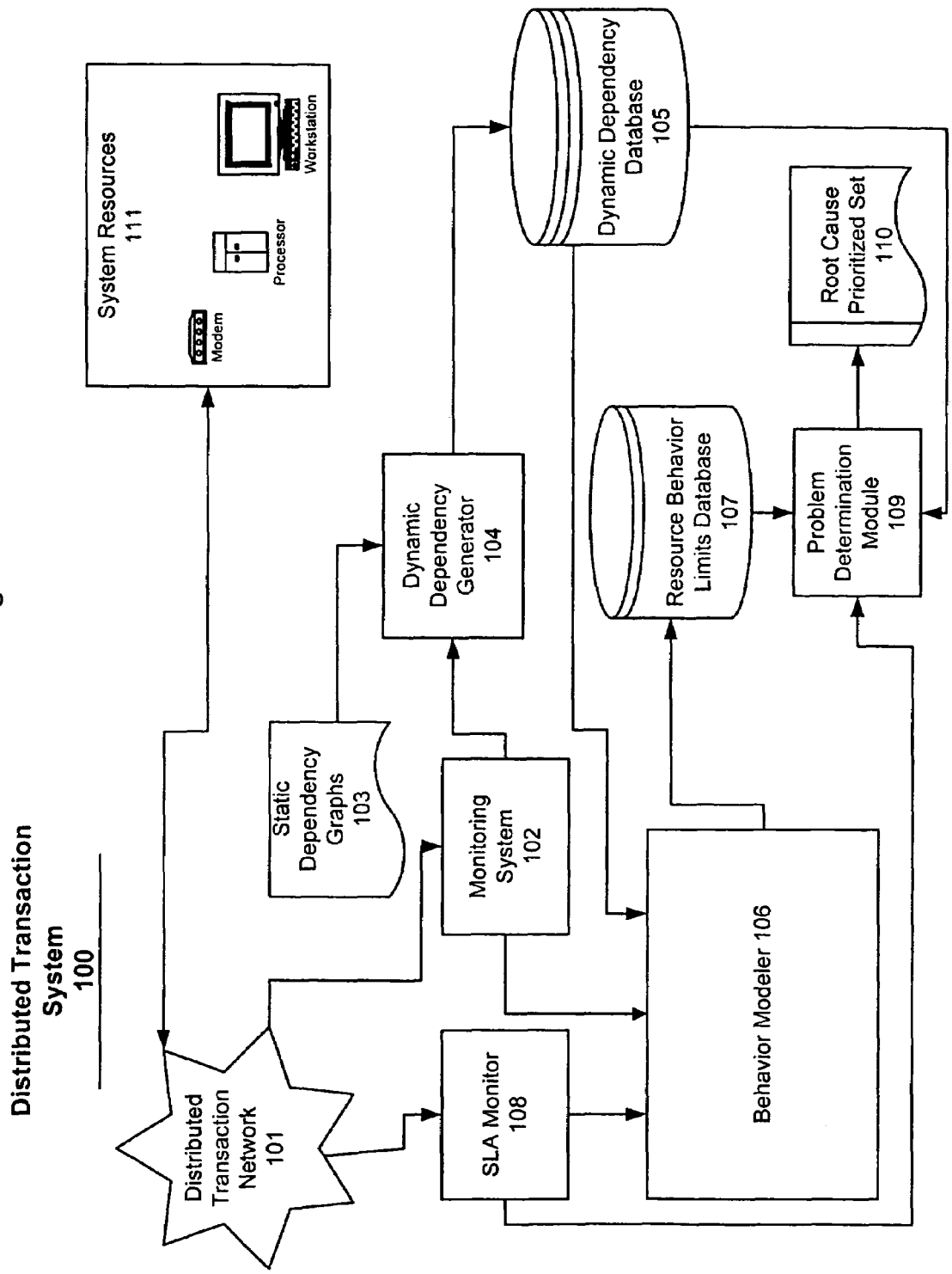
FIG. 1 is a block diagram of the problem determination system.

Referring now to the drawings, and more particularly to FIG. 1, there is shown a schematic of a Problem Determination (PD) system. A distributed transaction system 100 includes a distributed transaction network 101 and systems resources 111. The systems resources 111 are shown in FIG. 1 to include but are not limited to modems, processors and workstations but may also include numerous other types of typical I/T resources (e.g., HTTP servers, load balancers, application servers, database servers, caches, storage, transmission systems, etc.). Monitoring data from the distributed transaction system 100 is provided to the Service Level Agreement (SLA) monitor 108 and the monitoring system 102 of the invention via the distributed transaction network 101. The monitoring system 102 periodically polls each of the resources of the distributed transaction system 100 to obtain values of metrics which have been defined for the resources. The specific metrics that are measured for a given resource are design parameters that are typically chosen by the system administrator based on trial runs, experience, etc. The polled measurement information from the distributed transaction system 100 is delivered to the monitoring system 102 via standard protocols. The static dependency graphs 103 contains static dependency information that relates the types of resources in the system to each other and is used as a starting point by the dynamic dependency generator 104. The dynamic dependency generator 104 computes the dynamic dependency relationships between resources using the polled measurement data from the monitoring system 102 and/or from the static dependency graphs 103.

Figure 3:
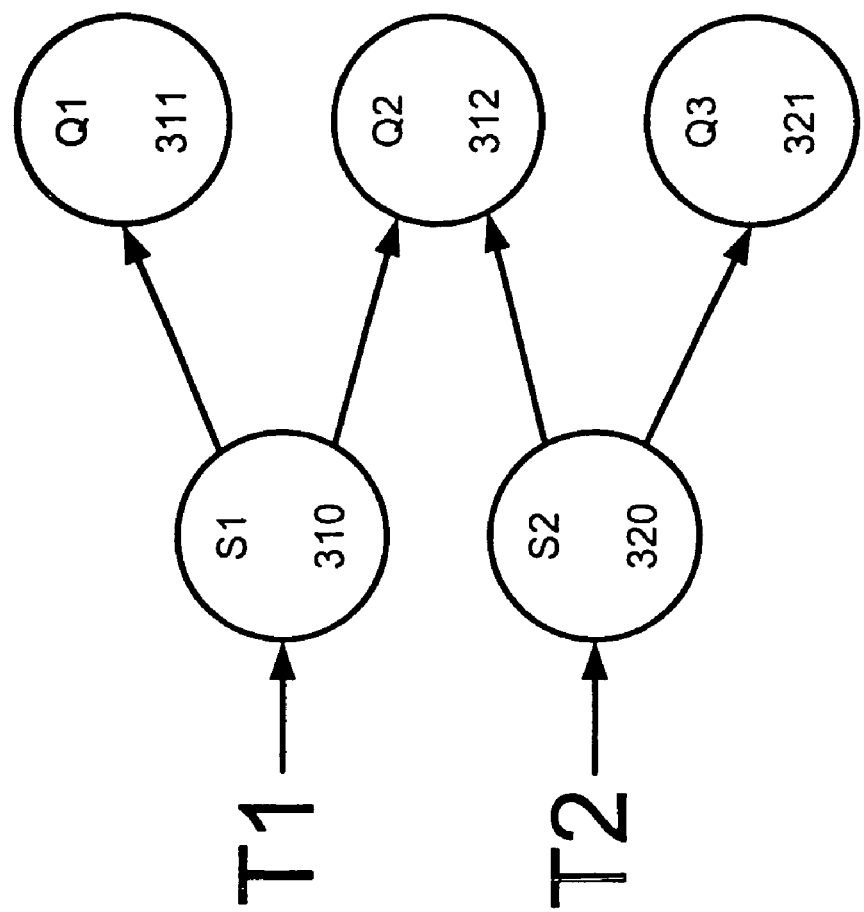
FIG. 3 is an example of a dependency graph.

FIG. 3 shows an example where transactions T1 and T2 are user transactions. Transaction T1 needs the services of servlet S1 shown as parent node 310 and SQL statements Q1 and Q2, shown as child node 311 and child node 312, respectively. While Transaction T2 requires the services of servlet S2 shown as parent node 320 and SQL statements Q2 and Q3, shown as child node 312 and child node 321, respectively.

Returning to FIG. 1, the dynamic dependency graphs generated by the dynamic dependency generator 104 are stored in the dynamic dependency database 105. The behavioral modeler 106 computes threshold limits for each resource based on monitored information from the monitoring system 102 and the dynamic dependency database 105. The resource behavior limits database 107 stores the resource limits calculated by the behavior modeler 106 along with the current severity values for each of the resources identified in the dynamic dependency database 105.

The SLA monitor 108 measures the performance of each of the user transactions in the distributed transaction system 100. The SLA monitor 108 measures the response time of each transaction instance and sends an alert event to the problem determination module 109 if a transaction type continuously violates the SLA threshold. If the SLA monitor 108 detects that a transaction type has an SLA violation, then the transaction type is considered in a "bad" state and an indicator is sent to the problem determination module 109. Otherwise, the state of the transaction is considered to be "good". The state of each user transaction is continuously updated at the behavior modeler 106.

The problem determination module 109 implements the problem determination algorithm. When the problem determination module 109 receives an alert from the SLA monitor 108 (e.g., "bad" state of a transaction), the problem determination module 109 retrieves the dependency graphs from the dynamic dependency database 105 and computes the severity values for each of the resources using the resource behavior limits database 107.

Figure 2:
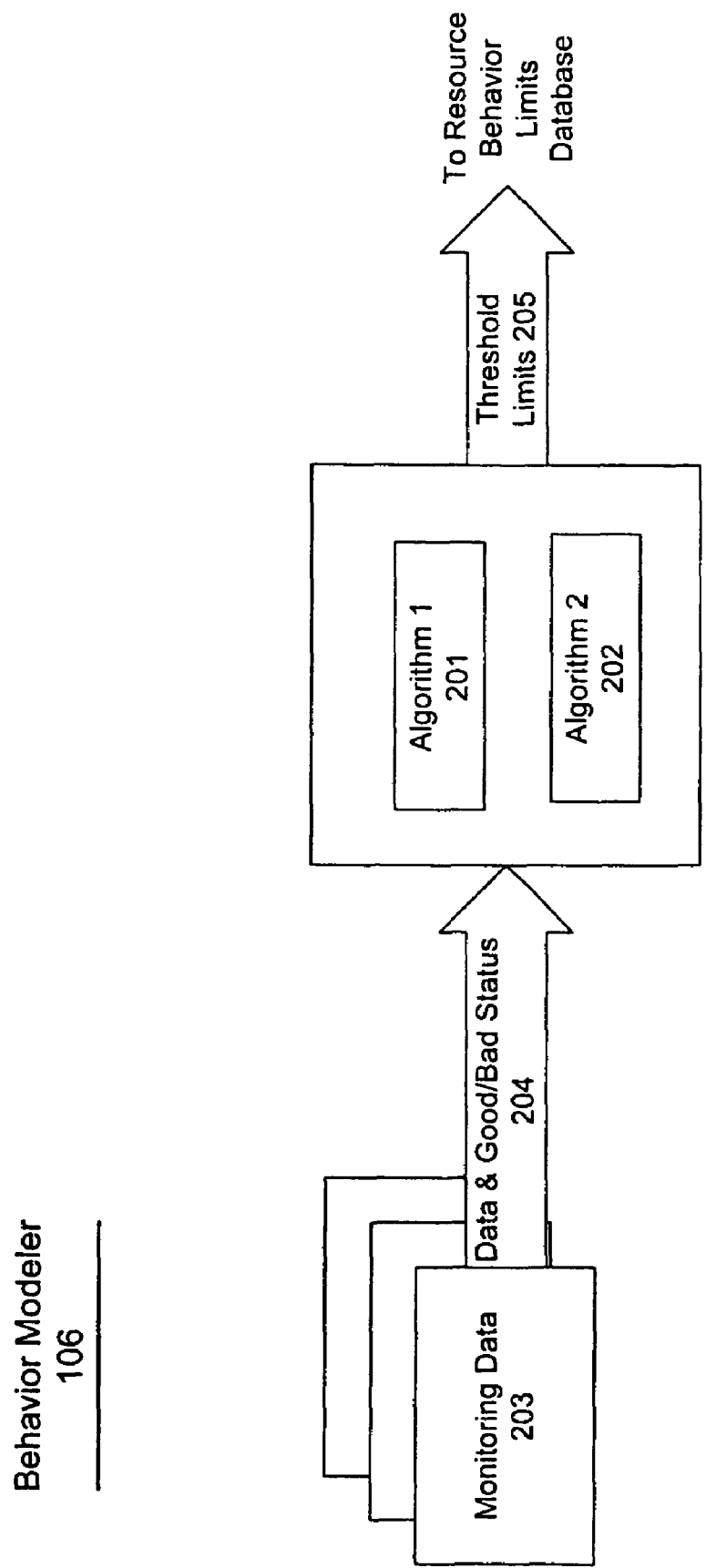
FIG. 2 is an illustration of the behavior modeler component of the problem determination system.

Looking now at FIG. 2, the behavior modeler 106 receives the monitor data 203, the good or bad state 204, and the dependency graphs (e.g., static and dynamic) from the dynamic dependency database 105. Using one of the several available algorithms, the limits for each of the monitored metrics related to the resource are computed. The threshold limits 205 are stored indexed by the resource identifier. This limit signifies a threshold to detect potential problems. In other words, if during operation, the values of the monitored metrics are above the limits, then the resource may be regarded as a suspect for an end-to-end problem experienced by a user transaction. The quality of the monitoring data (i.e., aggregated or per-transaction) affects the adjustment potential of the thresholds (e.g., respectively one threshold at each resource or one threshold per-transaction type) at each resource. The behavior modeler 106 is shown as having two algorithms available. However, it is understood by those skilled in the art that numerous algorithms could be added and the invention is not limited to just the two presented here.

Using algorithm 1, identified in FIG. 2 as 201, the average response time of a resource is used to compute an operational limit. This response time is cumulative and includes the response times of other resources invoked by the resource in question. The violation degree of a component with respect to its normal operating limit, called severity value, is computed to sort the components. The steps to compute the resource limits with algorithm 1 are:

1. read response time RT for resource i;
2. lookup graph to create S, set of transactions that depend on resource i;
3. if any element of S is in "bad" state
    bad_avg(i) = αbad_avg(i) + (1−α)RT;
    bad_N(i) = bad_N(i) + 1;
   else
    good_avg(i) = αgood_avg(i) + (1−α)RT;
4. if(bad_N(i) > β)compute severity(i) = bad_avg(i) / good_avg(i);
5. when problem is diagnosed reset
    bad_N(i) = bad_avg(i) = severity(i) = 0.

Using algorithm 2, the time locally spent by transactions at a resource is estimated and used to compute the upper operational threshold for the resource. To sort the resources, designated as suspects, algorithm 2 computes the severity value. The steps to build the resource limits using algorithm 2, where T stands for all transaction or for an individual transaction type, are:

1. read the aggregated (or per transaction) current average response time RT for resource i and its children k = 1, ..., M in the dependency graph;
2. compute the current average local time spent at resource i by T:

$$T_{Local\_i}(N) = RT_i(N) - \sum_{k=1}^{M} \frac{\# \text{Occurrences}_k}{\# \text{Occurrences}_i} \times RT_k(N),$$

where N is the number of HTTP requests in the system,
Occurrences$_i$ is the number of occurrences of resource i, and
Occurrences$_k$ is the number of occurrences of resource k
invoked by resource i during the period of time the response time averages are considered;
3. if Threshold$_{T\_i}$ has not been computed and there is no SLA -continued

```
violation related to transactions that depend on the resource i:
    a.  compute T_Local fraction of the end-to-end transaction average
        response time:
            P_i = T_Local_i(N)/RT_T_end-to-end(N)
    b.  compute T_Local threshold for the resource i traversed by
        transaction T:
            Threshold_T_i = SLA * avg(P_i)
4.  else if there have been SLA violation related to transactions that
    depend on the resource i:
        if (T_Local_i(t) > Threshold_T_i)
            #violations = #violations + 1
            if violations > n
            compute severity(i) = T_Local_i/Threshold_T_i;
        else severity(i) = 0.
```

The metric considered in algorithm 1 (i.e., the response time of a resource) is a cumulative metric since it includes the response time of the child resources. The cumulative time is a direct and effective way to rapidly identify a faulty path in the dependency graph, but, in many cases, is not adequate in pinpointing the root-cause resource without requiring additional steps for problem determination. The algorithm 2 captures the time locally spent at a resource, which is a non-cumulative metric since it excludes the response time of the sub-components. The algorithm to be used is chosen depending on the system requirements in terms of complexity and efficiency.

The problem determination module 109 in FIG. 1, sorts all nodes in affected sub-graph using severity values computed by the behavior modeler 106. Nodes with severity value 0, (i.e., which do not lie in the dependency graph of any user transaction that is in the "bad" state, are not considered any further.

Figure 4:
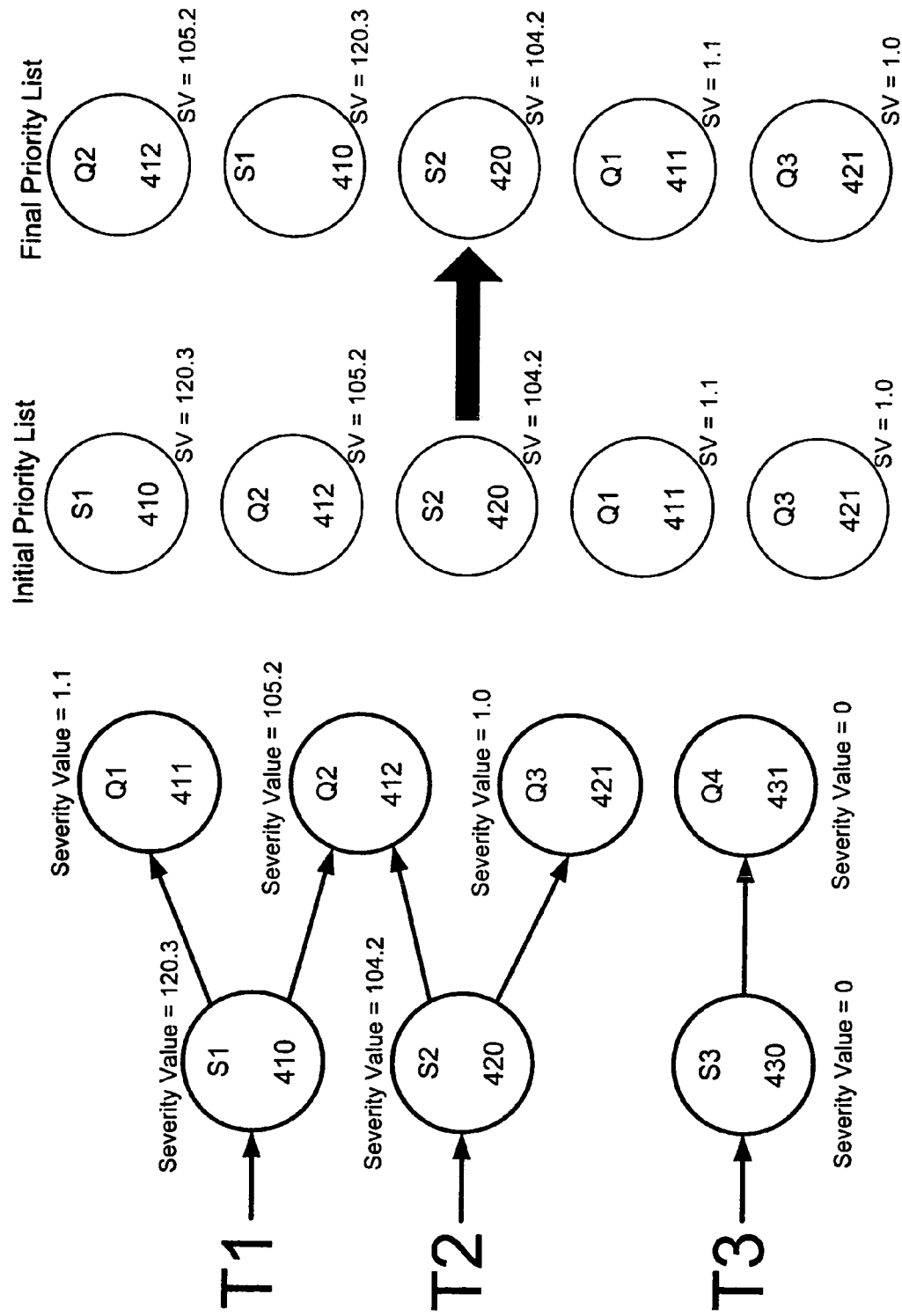
FIG. 4 shows a sample sorting process using the limits algorithm (algorithm 1 (201)) and dependency graph.

FIG. 4 represents the sorting if algorithm 1 is used when a parent of a root-cause node may have a higher severity value than a child root-cause node. To resolve this, the problem determination module 109 will apply 2-means clustering to divide nodes into high severity and low severity sets. If A and B are two resources and both A and B are in high severity set, and A is ranked higher than B, then swap the ranks of A and B. The top of the list is the likely root cause. Thus, in FIG. 4, parent node 430 and child node 431 do not lie in the dependency graph of any user transaction that is in the "bad" state, and are not considered any further. The priority list is then created based on the severity values of the suspect nodes and is shown in order as:

parent node 410 with severity value of 120.3,
child node 412 with severity value of 105.2,
parent node 420 with severity value of 104.2,
child node 411 with severity value of 1.1, and
child node 421 with severity value of 1.0.

The rule for parent-child node relationship is then applied which causes the child node 412 to be ranked above the parent node 411 in the final priority list.

While the invention has been described in terms of its preferred embodiments, those skilled in the art will recognize that the invention can be practiced with modification within the spirit and scope of the appended claims.

What we claim as new and desire to secure by Letters Patent is as follows:

1. A computer implemented method for performing problem determination within a distributed transaction system comprising the steps of:

computing operational limits for a set of resources in a distributed transaction system;
determining a poor performance status for said resources relative to said operational limits;
generating a list of root cause components which are likely to be causing said poor performance status;
prioritizing said list of root cause components; and
providing said prioritized list of root cause components to a system administrator,
wherein the step of computing operational limits for a set of resources in a distributed transaction system further comprises the steps of:
capturing monitored information from said distributed transaction system;
computing individual component level thresholds from user level SLAs; and
generating dynamic dependency data and said monitored information.

2. A computer implemented method for performing problem determination within a distributed transaction system comprising the steps of:

computing operational limits for a set of resources in a distributed transaction system;
determining a poor performance status for said resources relative to said operational limits;
generating a list of root cause components which are likely to be causing said poor performance status;
prioritizing said list of root cause components; and
providing said prioritized list of root cause components to a system administrator,
wherein the step of determining a poor performance status for said resources relative to said operational limits further comprises the steps of:
obtaining monitoring information relative to performance of a transaction;
identifying a sub-set of resources that are used to perform said transaction from said set of resources in said distributed transaction system;
obtaining performance information for each resource of said sub-set of resources; and
comparing said monitoring information with said performance information to make performance status determination.

3. A computer implemented method for performing problem determination within a distributed transaction system comprising the steps of:

computing operational limits for a set of resources in a distributed transaction system;
determining a poor performance status for said resources relative to said operational limits;
generating a list of root cause components which are likely to be causing said poor performance status;
prioritizing said list of root cause components; and
providing said prioritized list of root cause components to a system administrator,
wherein the step of generating a list of root cause components which are likely to be causing said poor performance status further comprises the steps of:
selecting one of several algorithms for calculating a severity value for each of said components; and
creating a priority list of said set root cause components based on severity values.

* * * * *